US009472045B2

(12) United States Patent
Halnais et al.

(10) Patent No.: US 9,472,045 B2
(45) Date of Patent: Oct. 18, 2016

(54) METHOD AND SYSTEM FOR MANAGING A POWER-CHARGING SPACE FOR A VEHICLE, ESPECIALLY A SELF-SERVICE ELECTRICAL VEHICLE

(75) Inventors: Pierre Halnais, Bouleurs (FR); Clément Lambrinos, Montreuil (FR); Aymeric Augustin, Ville D'Avray (FR); Raphaël Barrois, Paris (FR); Romain De La Ville, Port Marly (FR)

(73) Assignee: Bluecarsharing, Puteaux (FR)

( * ) Notice: Subject to any disclaimer, the term of this patent is extended or adjusted under 35 U.S.C. 154(b) by 154 days.

(21) Appl. No.: 14/129,349

(22) PCT Filed: Jul. 2, 2012

(86) PCT No.: PCT/FR2012/051523
§ 371 (c)(1),
(2), (4) Date: Mar. 11, 2014

(87) PCT Pub. No.: WO2013/001251
PCT Pub. Date: Jan. 3, 2013

(65) Prior Publication Data
US 2014/0167985 A1    Jun. 19, 2014

(30) Foreign Application Priority Data

Jun. 30, 2011    (FR) .................................... 11 02067

(51) Int. Cl.
*H02J 7/00* (2006.01)
*G07F 17/24* (2006.01)
*B60L 11/18* (2006.01)

(52) U.S. Cl.
CPC .......... *G07F 17/246* (2013.01); *B60L 11/1816* (2013.01); *B60L 2240/70* (2013.01);

(Continued)

(58) Field of Classification Search
CPC ..................................................... G07F 17/246
USPC .................. 340/901, 932.2; 701/22; 702/63; 320/108, 109; 705/5
See application file for complete search history.

(56) References Cited

U.S. PATENT DOCUMENTS 6,081,205 A * 6/2000 Williams .................. 340/932.2
2010/0161480 A1   6/2010 Littrell
(Continued)

FOREIGN PATENT DOCUMENTS

EP    2273462 A1    1/2011
FR    2872321 A1    12/2005

OTHER PUBLICATIONS

European Patent Office; Search Report in International Patent Application No. PCT/FR2012/051523 dated Sep. 11, 2012; 6 pages.
(Continued)

*Primary Examiner* — Brent Swarthout
(74) *Attorney, Agent, or Firm* — Wood, Herron & Evans, LLP (57) ABSTRACT

The invention relates to a method and a system for managing a parking space for a vehicle, for a space comprising means for detecting whether the space is occupied and at least one power-charging terminal suitable for automatic charging, especially automatic electrical charging following manual correction. Said method comprises, within a so-called occupation monitoring phase (as opposed to other phases such as a non-allocated vehicle storage phase): detection of a state of presence or absence of a vehicle or an object occupying the managed space, and detection of a state of connection or disconnection (operation or state) of a vehicle at the charging terminal. According to the invention, said method also comprises, in the event of a detection of presence without detection of connection, at least one so-called parking processing operation, for example, emitting at least one alert by acoustic or visual means, or recording or emitting at least one computer message.

16 Claims, 6 Drawing Sheets

(52) U.S. Cl.
CPC ......... *B60L2250/10* (2013.01); *Y02T 10/7005* (2013.01); *Y02T 10/7072* (2013.01); *Y02T 10/7291* (2013.01); *Y02T 90/14* (2013.01); *Y02T 90/16* (2013.01)

(56) References Cited

U.S. PATENT DOCUMENTS

| | | |
|---|---|---|
| 2011/0010281 A1 | 1/2011 | Wass |
| 2011/0093314 A1* | 4/2011 | Redmann et al. ............. 705/13 |
| 2011/0199049 A1* | 8/2011 | Nagy ............................ 320/109 |
| 2011/0213656 A1* | 9/2011 | Turner ....................... 705/14.49 |
| 2013/0088093 A1* | 4/2013 | Aschenbroich et al. ..... 307/112 |

OTHER PUBLICATIONS

French Patent Office; Search Report in French Patent Application No. 1102067 dated Mar. 8, 2012; 2 pages.

\* cited by examiner

METHOD AND SYSTEM FOR MANAGING A POWER-CHARGING SPACE FOR A VEHICLE, ESPECIALLY A SELF-SERVICE ELECTRICAL VEHICLE

The invention relates to a method and system for managing a vehicle parking space, for a parking space comprising means for detecting the occupation of said parking space and at least one power recharging terminal capable of automatic recharging, in particular automatic electrical recharging after manual connection. This method comprises, within a phase called occupation monitoring (as opposed to other phases such as a phase of storage of an unallocated vehicle):
- on the one hand detection of a state of presence or absence of a vehicle or of an object occupying the managed parking space, and
- on the other hand detection of a state of connection or not (operation or state) of a vehicle to the recharging terminal.

According to the invention, this method comprises moreover, in the case of the detection of presence without detection of a connection, at least one processing operation called parking processing operation, for example a transmission of at least one warning by audible or visual means, or by recording or transmission of at least one computerized message.

PRIOR ART

In the field of managing parking spaces, typically for light motor vehicles, the monitoring of the occupation of the parking space is an important aspect of allowing good management of parking spaces as well as their cost-effectiveness.

Thus, in the state of the art systems for detecting a vehicle in parking spaces are known. For example, the document FR 2 872 321 discloses a parking space associated with an identification terminal provided with means of identifying the user. If the user does not present his identification card at the terminal or it does not give him the right of access to the parking space in question, the law enforcement authorities are alerted by the system.

The problem is more complicated when the parking space also comprises a power recharging terminal, and even more so when it forms part of a "station" grouping together parking spaces dedicated to the vehicle of a specific vehicle fleet, for example due to fact that the vehicles should not all be managed in the same way according to the contract or the payment of each user.

This management in the context of a vehicle fleet operating in a self-service fashion moreover has additional problems, for example because these vehicles are intended to be both temporarily personalized while remaining interchangeable from one parking space to another and from one user to another.

A purpose of the invention is to overcome the drawbacks of the prior art, and in particular:
- to simplify and safeguard management of the occupation of the parking spaces, and management of the return of the vehicles at the end of an allocated period of time;
- to make this management more accurate and more flexible;
- to allow rapid intervention on site, that is appropriate depending on the nature of the situation, whether it is for example improper occupation, an oversight or malfunction; and
- to allow the management of different service possibilities, for example for use by different types of users and vehicles depending on the operational objectives.

SUMMARY OF THE INVENTION

The invention proposes a method for managing a parking space for a vehicle, for a parking space comprising means for detecting the occupation of said parking space and at least one power recharging terminal, also called charging terminal, capable of supplying electricity to a vehicle connected to (or plugged into) the terminal.

According to the invention, this method comprises, within a phase called occupation monitoring (as opposed to other phases such as a phase of storing an unallocated vehicle):
- on the one hand detection of a state of presence or absence of a vehicle occupying the managed parking space, and
- on the other hand detection of a state of connection or not (operation or state) of a vehicle to the recharging terminal.

According to the invention, this method comprises moreover, in the case of detection of presence without detection of a connection, at least one processing operation called parking processing operation, for example a transmission of at least one warning by audible or visual means, or by recording or transmission of at least one computerized message. Such a transmission can be carried out for example immediately as simple user information regarding the state of the process, and subsequently become a warning with a request for intervention in case of non-regularization.

In this sense, the invention also proposes a system for managing a parking space for a vehicle, for example, which comprises:
- means for detecting the occupation of said parking space;
- means for providing power forming a recharging terminal capable of supplying electricity to a vehicle connected to the terminal;
- means for detecting connection of a vehicle to said recharging terminal;
- audible, visual or digital means of transmission of at least one information message or a warning message reporting in particular an unauthorized occupation of the parking space; and
- data processing means configured for implementing such a management method.

According to a feature, the method according to the invention can comprise moreover a countdown of a time period from a positive detection of presence at a given moment. The triggering of the parking processing operation is then dependent on a detection of presence (for example continuous or repeated) with absence of connection (report or deduction of the state of disconnection) at the end of said time period. Such a warning, after a time period for regularization, can for example be combined with direct information. This makes it possible to avoid triggering the processing operation when the presence detected is an object simply passing in front of the charging terminals.

In the method according to the invention, the processing operation comprises a step of reporting the unauthorized occupation of the space, using audible and/or visual means on the terminal or means of transmission of a message to a terminal of a predetermined recipient, for example a service user (in particular, to whom the vehicle situated on the parking space be longs), a service operator or the law enforcement authorities. Such a message can be an e-mail, MMS, SMS. It is generally sent by a central computer system providing the management of the terminals and of the vehicle fleet and capable of communicating with the charging terminals.

The parking processing operation can also comprise a step of verification of at least one item of digital data representing the presence or absence of parking authorization and making it possible to determine if the vehicle is authorized to park at least temporarily in the parking space, even in the absence of a connection. This authorization can for example be activated on and/or stored in the recharging terminal, or by communication with a computer kiosk interface such as a rental terminal, or by communication with a computer system managing a plurality of vehicles which are compatible in an interchangeable manner with a plurality of parking spaces.

The method can moreover comprise a countdown of the elapsed time since the start of the detection of presence or since the start of the parking processing phase, in particular if it is determined that the vehicle has obtained a parking authorization. Once the time period has elapsed, the item of data relating to the parking authorization can be modified, which means that the vehicle will no longer be authorized to park and/or that the reporting step can occur.

According to a feature of the invention, the method can also comprise a step of verification if the detected vehicle is a member of a group of vehicles which are compatible with the recharging terminal. Such a step can be carried out at least using a comparison of the GPS coordinates of each of the vehicles of the group with those of the parking space. A step of reporting (for example, sending a message to the law enforcement authorities) can also be implemented if it is determined that the vehicle is not a member of the group.

A step of reporting of another type (for example sending a message to a user associated with the detected vehicle) can also be implemented when the vehicle is detected as a member of the group of managed vehicles.

In fact, according to a feature, in the event of positive membership of the vehicle in the group of vehicles which are compatible with the recharging terminal, the processing can comprise moreover the following steps, for example in the parking processing:

search for an identifier representing a user currently in charge of the detected vehicle, by a computer system managing a plurality of vehicles which are compatible in an interchangeable manner with a plurality of parking spaces; and
transmission of a digital message to said user currently in charge of the vehicle.

It should be noted that the operations of verification of authorization and membership are optional and can each constitute the only verification carried out, or can be carried out one after the other.

Advantageously, when the connection of a vehicle to the terminal is detected, the method determines if the vehicle is a member of a group of vehicles which are compatible with the charging terminal, for example by means of digital communication of said recharging terminal with the connected vehicle. This can be in particular be carried out by the exchange of information via a pilot wire belonging to the connection between the vehicle and the terminal.

Preferentially, the occupation monitoring phase is triggered by an operation of disconnection of a vehicle from the terminal or by the start of a determined time phase, representing for example a period during which the vehicle occupying the managed parking space is allocated to a specific user by a computer system managing a plurality of vehicles which are compatible in an interchangeable manner with a plurality of parking spaces.

It can also be envisaged that the occupation monitoring phase is carried out only during the first detection of a vehicle by the presence detector.

The invention can thus, for example, provide the user in good faith with information regarding a bad connection or connection oversight, or expired or undeclared parking.

The invention thus makes it possible to detect fraud, but can also make it possible to detect problems due to faulty return of a vehicle by the user, for technical reasons or human error.

It makes it possible to simplify and safeguard management of the occupation of parking spaces in a more accurate and more flexible manner, as well as managing the return of the vehicles at the end of an allocation period and its reintroduction into the overall storage and availability system. It also allows rapid intervention at the parking space that is appropriate depending on the nature of the situation, whether for example unauthorized occupation, an oversight or faulty operation.

Moreover, it makes it possible to offer and manage different service possibilities, for example for the use of different types of users and vehicle depending on the operational objectives, such as for example temporary parking for the use of the users of vehicles of the managed fleet, or power recharging intended for users of vehicles which are technically compatible but are not members of the managed fleet.

Various embodiments of the invention are envisaged, incorporating the different optional features disclosed here, according to their possible combinations overall.

Other advantages and characteristics of the invention will become apparent on examination of the detailed description of an embodiment which is in no way limitative, and the attached diagrams, in which.

DETAILED DESCRIPTION

The invention is here described within the scope of its implementation in a car sharing system, which offers the short term rental of motor vehicles of the private vehicle type. This system is provided to offer this self-service rental in an interchangeable manner among different stations distributed within a predetermined operational area, and in which all the vehicles can equally well be rented at one station and returned at another.

The invention can however be implemented in systems or services more or less similar to or different from that described here.

Figure 1:
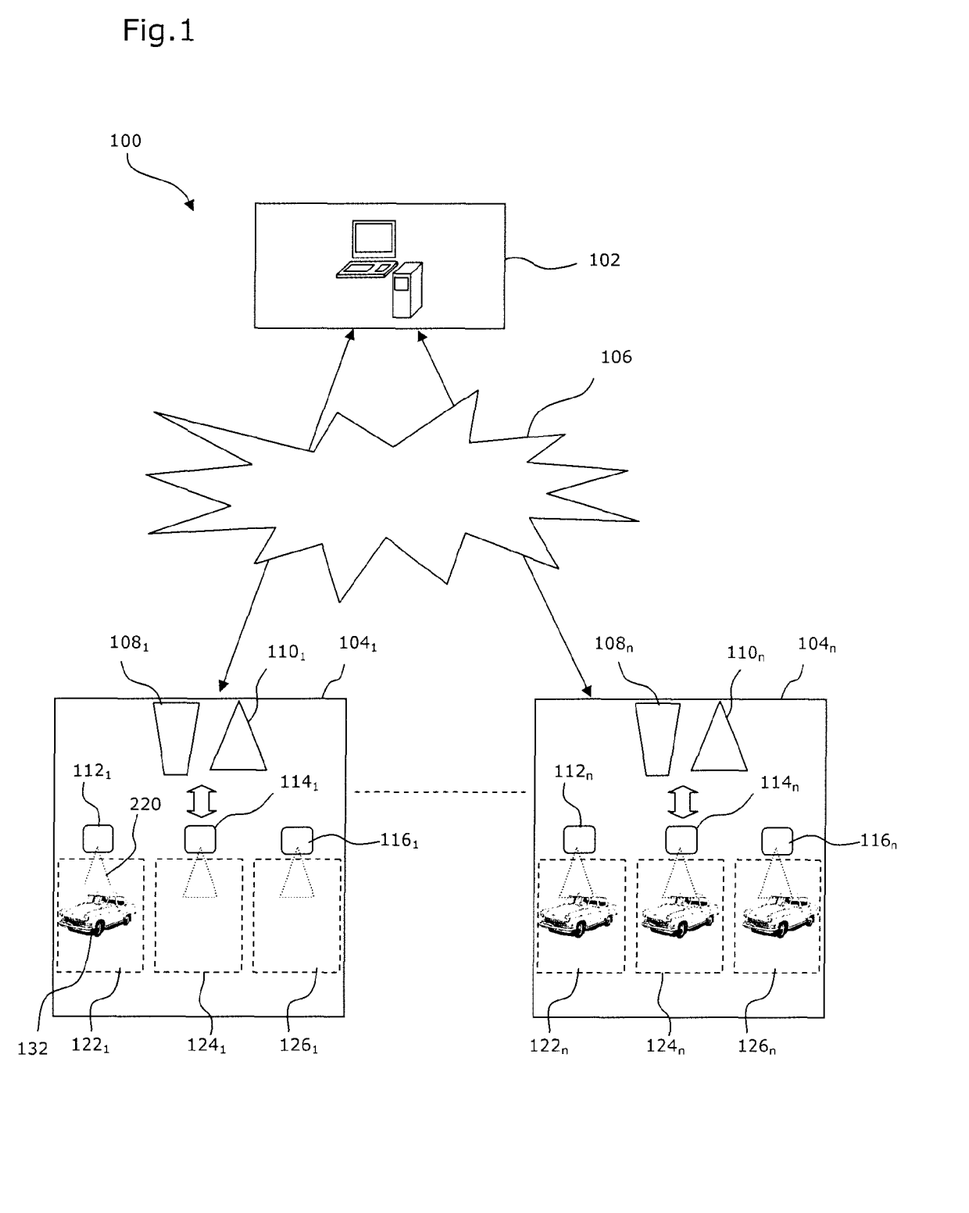
FIG. 1 is a diagrammatic representation of an example system for the overall management system of a fleet of electric vehicles offered for rental.

FIG. 1 is a diagrammatic representation of an overall management system for such a fleet of electric vehicles offered for rental and the corresponding stations.

The system 100 shown in FIG. 1 comprises a central site 102 (also called central agency in the remainder of the description) connected to several sites—or stations—104₁-104ₙ, called rental sites or stations, by means of a wireless communication network 106, for example GPRS, or a wired network, for example of DSL type. Preferably, each station is linked to the central site via both separate networks, which allows continuous connection even if one of the networks fails.

Each rental station comprises a subscription terminal 108 for registering a new subscriber, a rental terminal 110 for vehicle rental and several charging terminals 112-116, each charging terminal being provided for charging a vehicle equipped with an electric battery at a parking space.

The central site 102 can be connected directly to each of the terminals of a rental station 104 by means of the network 106 or solely at the subscription terminal and/or at the rental terminal and/or at the charging terminals 112-116.

At least two terminals of a rental station are connected to each other by means of a wired connection (not shown).

The central site 102 is also arranged in order to be connected to an electric vehicle comprising a data connector to one or more elements of the vehicle and/or user communication interface, via a GPRS network. Each vehicle is for that reason equipped with a GSM chip.

The central site 102 is also arranged in order to exchange information with a portable communication device such as a PDA, a mobile phone, etc., carried by a rental service operator and also linked to the central site by means of a GPRS network.

The system makes it possible to manage a plurality of vehicles each comprising a control unit capable of communicating with the central agency and with different elements of the vehicle, and a user interface.

Users are capable of interacting with the different terminals as well as with the different elements of the vehicles. Moreover, the vehicle rental service with the system according to the invention can be also carried out with the help of the operators and their mobile terminal such as a PDA, who can intervene in the service.

Figure 2:
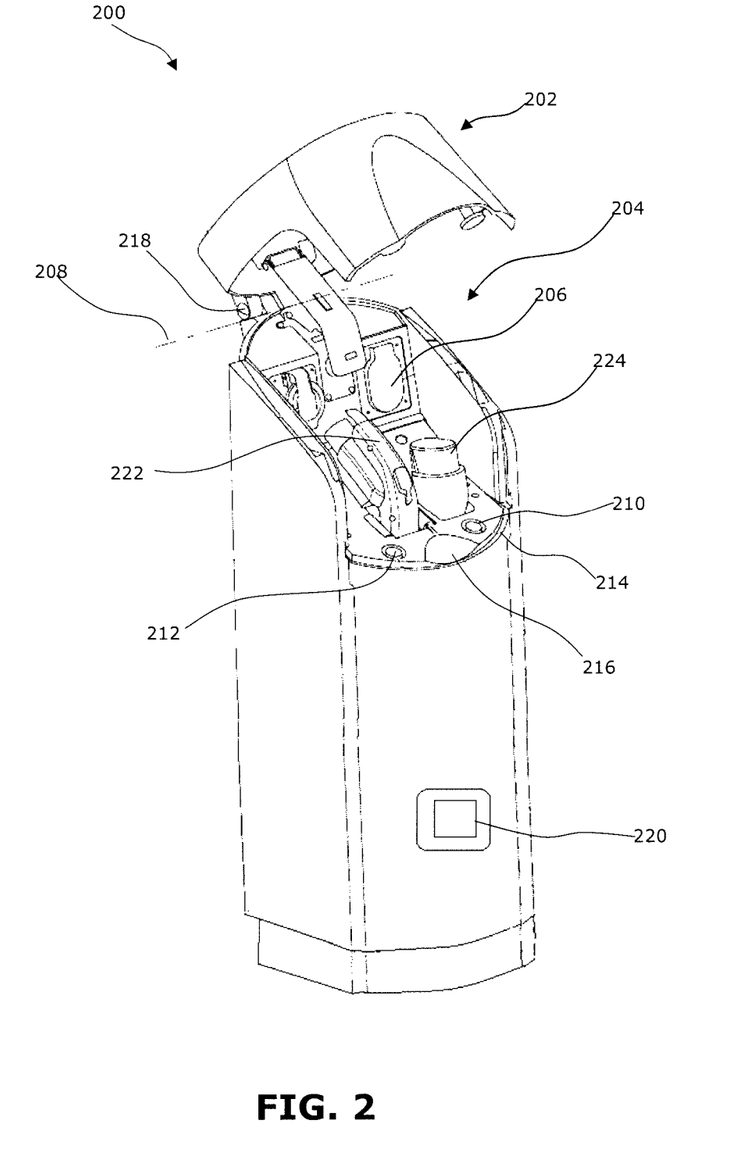
FIG. 2 is a diagrammatic representation of a charging terminal in a parking space management system according to the invention.

FIG. 2 is a diagrammatic representation of a recharging terminal (or charging terminal) according to the invention.

The charging terminal 200 comprises a movable cover or lid 202 covering a subscriber interface area/compartment 204 that is mainly situated under the movable lid 202.

This area 204 comprises a female charging connector socket 206 which makes it possible to supply private vehicles, for example a type 3 connector according to the standard IEC 61851-1 or IEC 62196-2.

The area 204 comprises moreover a reel carrying a multicore electric cable provided at one end with a male connector 224 to be inserted into the socket 206. The other end of the cable has a movable plug 222 for the charging connection to a compatible electric vehicle, as well as one or more communication pilot wires between the terminal and the electronic system of the vehicle.

This area 204 also comprises a storage space for the movable plug 222 and a storage space for the connector 224 on the charging terminal side to connect to the type 3 socket 206.

The charging terminal comprises a built-in cable for connecting to a vehicle equipped with a female connector, and/or a plug (in particular of type 3) for connecting to a vehicle equipped with a male connector. According to a particular embodiment of the invention, the built-in cable must be plugged at one end into the type 3 plug in order to be connected to the mains supply. It is connected onto the vehicle at its other end (see below)

A vehicle presence detector 220 is controlled by the terminal 200 associated with a predetermined parking space. It can be incorporated into the unit, for example in the form of an infrared sensor or a camera—preferably situated in the lower part of the unit as shown in FIG. 2, or be incorporated into the parking space for example in the form of a current loop in the ground. The terminal 200 comprises a connection detector, for example in the form of a pilot wire for connection to the terminal of a plug of a cable built into the vehicle, or for connection to the vehicle of a plug connected to the terminal. This detector can also comprise means for detecting the connection of a mechanical locking means between the socket 206 and the cable and/or between the vehicle and the cable.

Each vehicle 132 managed by the system 100 comprises an electronic control unit which contains and updates information concerning the vehicle, such as its identifier and its GPS coordinates. The vehicle is capable of communicating with the central system 102 using a wireless link, typically a digital telephonic communication of the GPRS type. It can also comprise means for communicating with the charging terminal, for example by a local radio link or using the electrical connection between these two elements. The charging terminal 122 comprises means for communicating with the rental terminal 110 of the station, which communicates with the central system 102.

Figure 3:
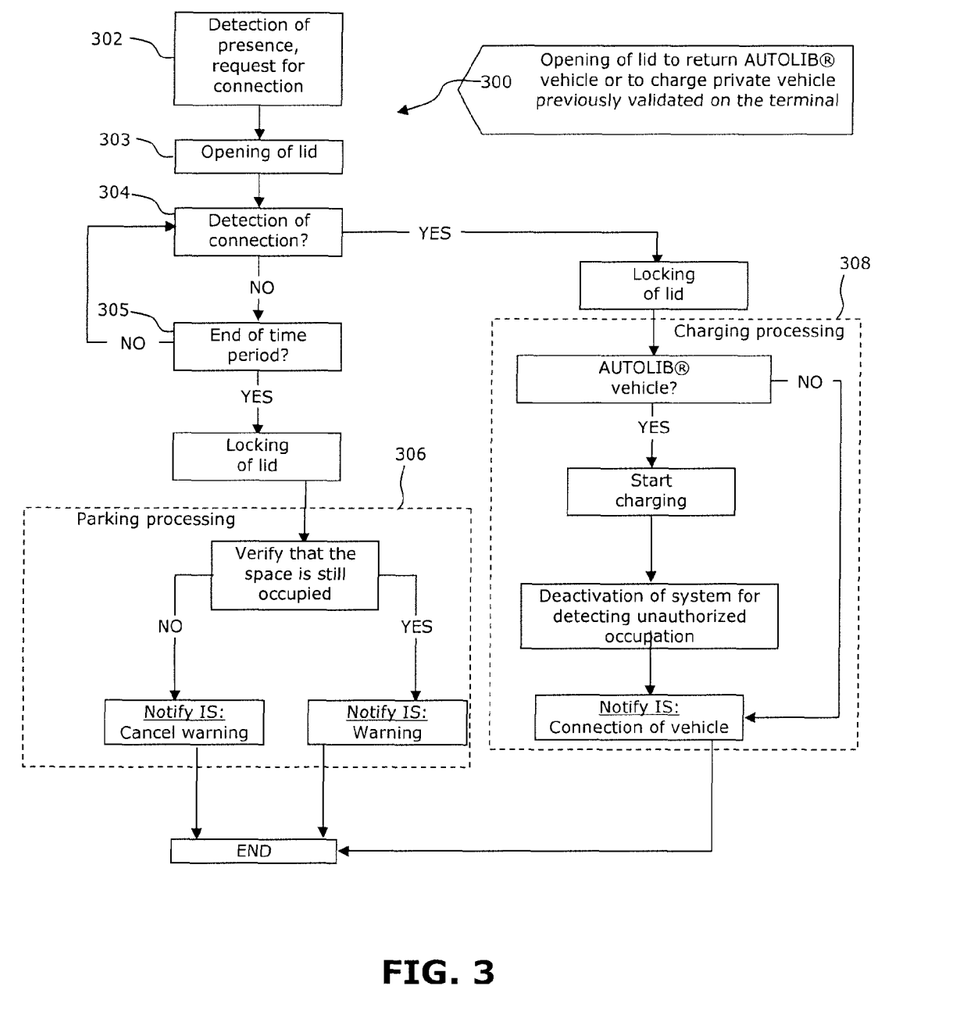
FIG. 3 is a diagrammatic flow chart showing an embodiment example of the method according to the invention during the arrival of a vehicle into a parking space.

FIG. 3 diagrammatically shows the sequence of a phase of monitoring of unwanted occupation, also called here detection of unauthorized occupation, in an embodiment example of the invention.

In this example, no vehicle is initially present in the space, and the detector of unwanted occupation is activated. When the presence of an element in the parking space is detected 302 (in particular for a duration exceeding a threshold duration for greater reliability), a predetermined time period is allowed to pass, counted down by an internal clock of the charging terminal and then detection of the connection 304 is requested.

If no connection is detected 304, the charging terminal triggers a process 306 for processing the management of parking in the absence of a connection.

At the end of this parking processing 306, if the terminal finds that the parking is unwanted, it verifies that the presence detector still detects a vehicle in the parking space. If this is the case, it informs the central agency 102 (or information system=IS) of this exceptional circumstance. The warning can also be issued by light or audible reporting, for example on the charging terminal, or even on the rental terminal. The warning can also be issued by sending an e-mail message or SMS to a fixed or mobile terminal of a service operator, or to the law enforcement authorities.

In order to transmit this warning, the charging terminal transmits to the central agency, via the rental terminal, a message indicating the anomaly that it finds, the message moreover comprising the identifier of the rental and/or charging terminal. The central agency constructs a warning message, for example to the law enforcement authorities or an operator, for example via a GSM chip making it possible to do this. Preferably such a message comprises the location of the charging terminal, obtained using the information taken from an internal database of the system.

As seen in FIG. 3, if a connection is detected 304, a command is sent to lock the lid 202. This locking can optionally be triggered automatically when a predetermined time period 305 has elapsed since the lid was opened. Then, if the vehicle is a member of a fleet of vehicles which are available to the users of the rental service, charging the vehicle starts and the presence sensor is deactivated. Also the central agency 102 is notified. If the vehicle is not a member of the fleet of managed vehicles this sensor is not deactivated, for example to allow a countdown of the parking time and possibly a billing or a restriction on the charging time.

Figure 4:
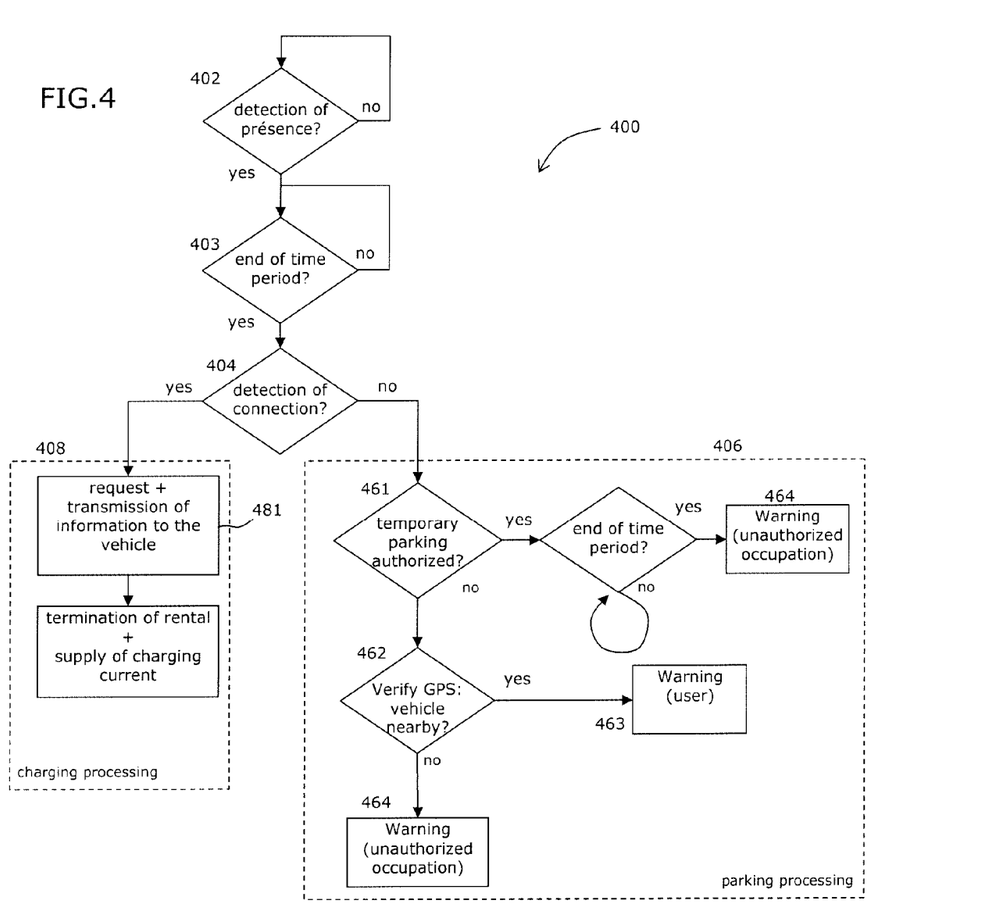
FIG. 4 is a diagrammatic flow chart showing an embodiment example of the method according to the invention during the arrival of a vehicle at a parking space, in a variant with a warning to the user in the event of a managed vehicle which is not connected.

FIG. 4 diagrammatically shows the sequence of a phase of monitoring unwanted occupation, in an embodiment example in which the parking processing comprises additional verification processing steps. In this example, one or more verifications can be carried out in order to manage specific cases, for example to avoid disturbing the rental agent or the law enforcement authorities when it is not necessary.

In a first variant, once the presence of a vehicle is detected 402 but its connection is not detected 404, it can be verified 461 if a temporary parking (for a predetermined maximum duration, for example 15 minutes) has been requested.

The driver of a vehicle that is a member of the fleet of managed vehicles can in fact have the opportunity of requesting temporary parking. In order to do this, he must preferably be identified and have requested temporary parking by pressing on a control of the interface of a charging or rental terminal, and verification can be carried out at the central agency in order to verify that a vehicle is being rented to this user, which will permit authorization of the request for temporary parking.

Independently of the conditions required for requesting temporary parking, the method comprises a step of verification of the state of the parking space, in particular with the rental terminal or the module for supervising the terminals of the central agency which stores information on the state of these spaces. If the state of temporary parking thereof is shown, the warning step does not occur. The temporary parking status is automatically deactivated once the predetermined duration elapses.

In a second variant, which may or may not be combined with the first, the system verifies 462 that a rented car is parked in the predetermined parking space. This can be done by means of a GPS module situated in the car and allowing location thereof and a real-time communication from the car to the central agency, the control unit transmitting the coordinates of the vehicle to the central agency. If a car that is a member of the vehicle fleet is parked in the space, a first person (for example an agent and/or the user to which this vehicle has been allocated) is called. If it is not a car that is a member of the vehicle fleet, a second person can be called, for example in particular the law enforcement authorities in order to manage the removal of this vehicle).

It should be noted that when a vehicle that is a member of the vehicle fleet is recharged 408 on a charging terminal, information relating to it can be transmitted 481 to the rental system (connection time, summary of the rental, etc.), through the charging terminal and/or the rental terminal or through the direct vehicle/central agency link.

The sequence of the occupation monitoring process can thus comprise the following steps:
  detection 402 of the presence of vehicle 130 in the monitored parking space 122$_1$,
  optionally, countdown 403 of a predetermined waiting time;
  connection detection test 404;
  If a valid connection is made, processing 408 of the charging of the vehicle:
    sending an information request to the vehicle,
    transmission of the information to the central system 102,
    if appropriate, recording of the termination of the rental by the system, and
    sending current to the unit for recharging the vehicle, depending on the requirements and the charging regulation system;
  If no connection is made, or if it is unsatisfactory, processing 406 of parking:
    If temporary parking 461 is authorized by a user, for example by providing identification according to means of a known type, countdown of a predetermined time;
      When the predetermined time has elapsed, if the vehicle is still present, the central system 102 is informed of this by one of the elements of the station 104,
      the central system then identifies the current person in charge of the vehicle by crosschecking data in the central database and transmits a warning message to them, and/or warns a rental agent who is on site or mobile;
    If no user has reported or given authorization 461 for temporary parking:
      verification 462 in the database of the vehicles that are members of the vehicle fleet, in order to determine if a vehicle from the rental fleet is close to the parking space—for example by comparing the current GPS coordinates of each of the vehicles with those of the parking space concerned;
      in the case where the system identifies a vehicle from the fleet which is present at these coordinates or nearby and which is not connected, it identifies 463 the current person renting the vehicle by crosschecking the data in the central data base and warns them, and/or warns a rental agent—for example to rectify a connection oversight or a malfunction in the connection operation
      in the case where no vehicle of the managed fleet is identified at this parking space or in this area or is connected, the system considers 464 that this is unwanted occupation of the parking space and warns a rental agent or the law enforcement authorities.

Figure 5:
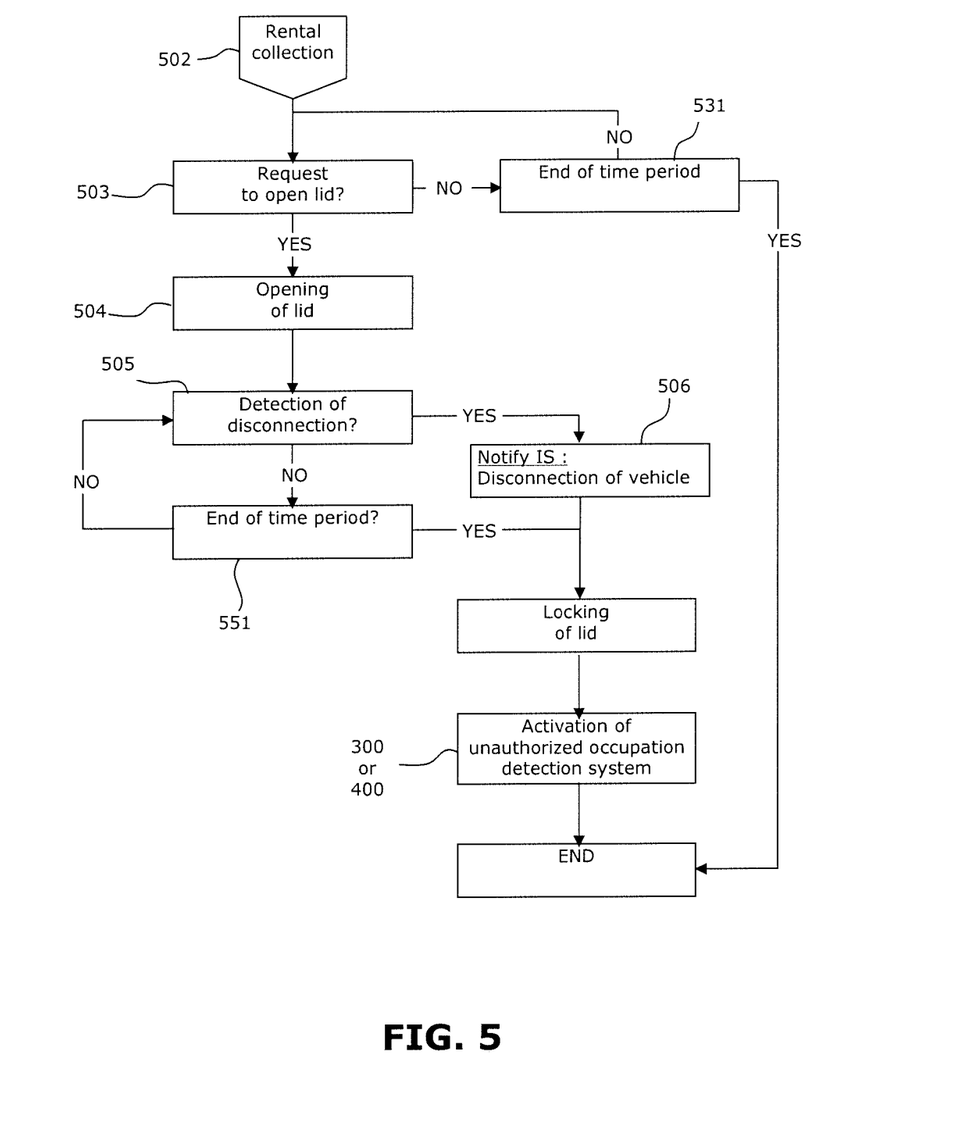
FIG. 5 is a diagrammatic flow chart showing an embodiment example of the method according to the invention during the departure of a vehicle from a parking space.

FIG. 5 is a diagrammatic flow chart showing an embodiment example of the method according to the invention during the departure of vehicle from a parking space.

At the start of the rental 502, the user requests the opening 504 of the lid 202 in order to disconnect the vehicle. When the manual disconnection is detected 505, the vehicle is then considered allocated, and no longer stored in the parking space. The occupation monitoring phase 300, 400, and in particular the presence sensor, is then activated when the disconnection of a vehicle is recorded 506, and the vehicle is considered parked.

The occupation monitoring phase 300, 400 is also activated from the moment that the vehicle remains connected to the terminal from a time greater than a threshold duration, such as for example at the end of a time period 531 counted from the rental 502 of the vehicle or from a time period 551 counted from the request to open the lid.

Figure 6:
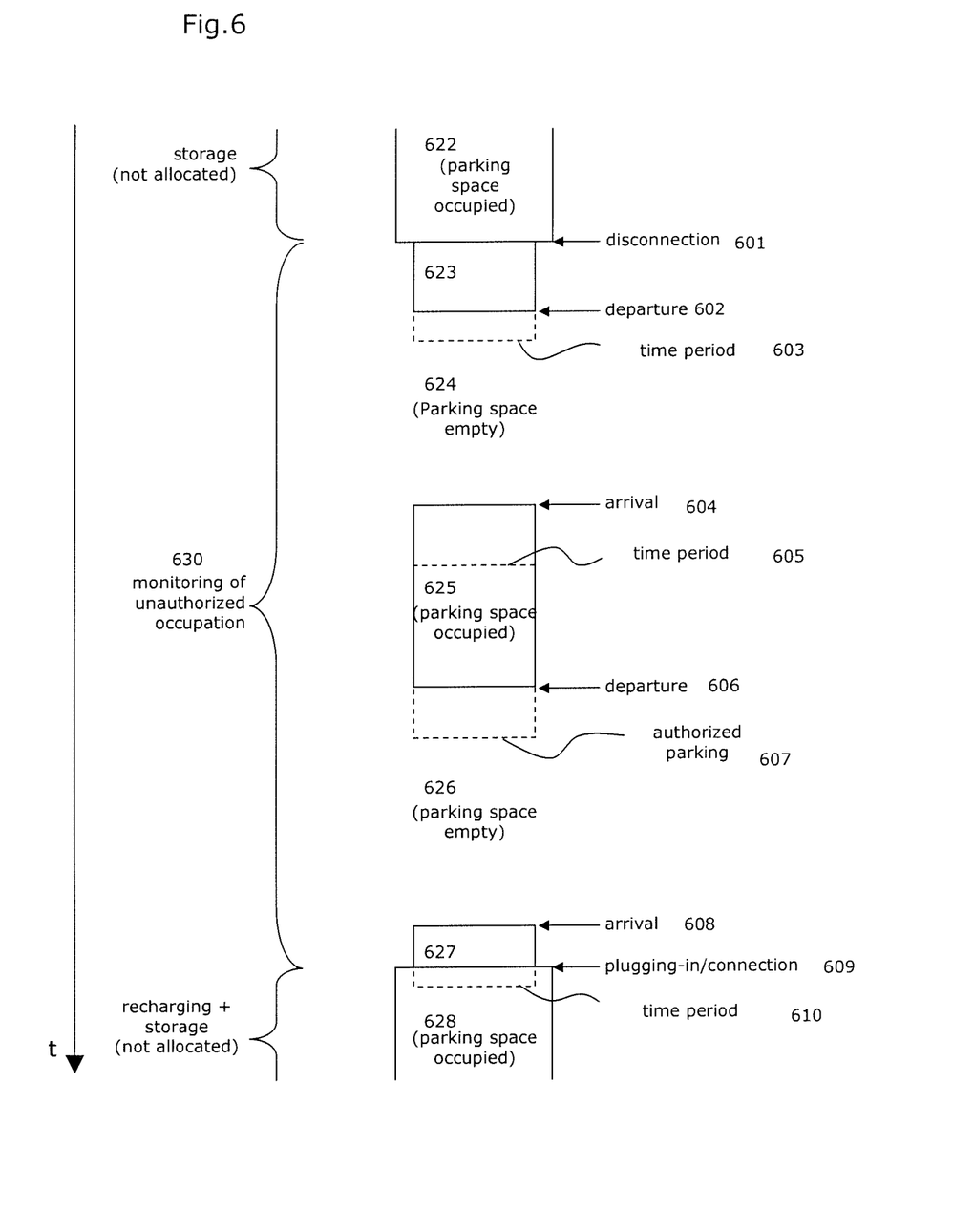
FIG. 6 is a time line showing an example of the operation of a managed parking space according to the invention.

FIG. 6 is a time line showing an example of a possible operational cycle of a managed parking space according to the invention.

At the end of a storage period 622 of a unallocated vehicle, represented by the broad bar in the figure, a rental with disconnection 601 is recorded by the system. The occupation monitoring phase 630 starts and the parking space remains occupied 623 in parking mode, represented by a narrower bar, until departure 602 which takes place here before the end of the time period 603.

After a vacancy period 624 of the parking space, another managed vehicle arrives 604 in the managed parking space, and the user reports a temporary parking before the end of the time period 605. The parking space is occupied 625 as authorized temporary parking, for a duration in this case of less than the maximum authorized duration 607.

Exceeding the maximum authorized duration 607 would then lead to a warning, for example a light warning.

After a fresh vacancy period 626 of the parking space, yet another vehicle arrives 608 in the managed parking space. The parking space is then occupied 627 in parking mode, until the user connects the vehicle 609 and ends the rental, before the end of time period 610.

The occupation monitoring phase 630 is then terminated and the parking space is again in the unallocated storage mode 628, if necessary with automatic recharging by the terminal.

During the occupation monitoring phase 630, any exceeding of the time periods 603, 605, 610 or of the authorized temporary parking 607 would have caused the transmission of a warning accompanied by information on the nature of the reported time in excess and the previous operations, to an operator or the law enforcement authorities, for example for technical intervention or for reporting offences or removal.

Of course, the invention is not limited to the examples which have just been described and numerous adjustments can be made to these examples without exceeding the scope of the invention.

The invention claimed is:

1. A method for managing a parking space for a vehicle, said parking space comprising means for detecting the occupation of said parking space and at least one power recharging terminal capable of providing electricity to a vehicle connected to this terminal, the method comprising, within a phase called occupation monitoring:
   detecting a state of presence or absence of a vehicle occupying the managed parking space, and
   detecting a state of connection or not of a vehicle to the recharging terminal; said method comprising moreover, in the case of a detection of presence without detection of a connection, at least one processing operation called parking processing operation, comprising transmitting at least one warning by audible or visual means, or by recording or transmission of a computerized message,
   wherein the parking processing operation comprises verifying if the detected vehicle is a member of a group of vehicles which are compatible with the recharging terminal by determining that a location characteristic of the detected vehicle corresponds to a location characteristic of a fleet vehicle.

2. The method according to claim 1, further comprising: counting down a time period from a positive detection of a presence at a given moment; and
triggering of the parking processing operation dependent on a detection of presence with the absence of connection at the end of said time period.

3. The method according to claim 1, wherein determining if the vehicle is a member of a group of vehicles that are compatible with the charging terminal is performed when the connection of a vehicle onto the terminal is detected.

4. The method according to claim 3, wherein, in the case of a detection of presence with a connection, the method further comprises:
   digital communication between the recharging terminal and the connected vehicle; and
   transmission or recording of at least one digital message representing an identifier of the vehicle and a moment of connection of said vehicle to said terminal, to a computer system managing a plurality of vehicles that are compatible in an interchangeable manner with a plurality of parking spaces.

5. The method according to claim 4, in which the parking processing operation comprises a step of reporting the unauthorized occupation of the parking space.

6. The method according to claim 1, wherein the parking processing operation comprises a step of verification of at least one item of digital data for determining if the vehicle has obtained parking authorization.

7. The method according to claim 6, wherein, if it is determined that the vehicle has obtained a parking authorization, the method comprises moreover a countdown of the elapsed time since the start of the detection of presence or since the start of the parking processing operation.

8. The method according to claim 1, wherein, in the case of a positive membership of the vehicle in the group of vehicles which are compatible with the recharging terminal, it comprises moreover the following steps:
   searching for an identifier representing a user currently in charge of the detected vehicle, by a computer system managing a plurality of vehicles which are compatible in an interchangeable manner with a plurality of parking spaces; and
   transmission of a digital message to said user currently in charge of the vehicle.

9. The method according to claim 6, further comprising reporting the unauthorized occupation of the parking space in at least one of the following cases:
   the vehicle does not have a parking authorization, or
   the vehicle does not belong to the predetermined group of vehicles.

10. The method according to claim 1, wherein the occupation monitoring phase is triggered by an operation of disconnection of a vehicle from the terminal or by the start of a determined time phase.

11. A system for managing a parking space for a vehicle, comprising:
   means for detecting the occupation of said parking space;
   means for providing power forming a recharging terminal capable of supplying electricity to a vehicle connected to the terminal;
   means for detecting connection of a vehicle to said recharging terminal;
   audible, visual or digital means of transmission of at least one data message or a warning reporting in particular an unauthorized occupation of the parking space; and
   data processing means configured for implementing the management method according to claim 1.

12. The system according to claim 11, further comprising means of digital communication with at least one of:

data processing means of a vehicle which is a member of a fleet of vehicles which are compatible in an interchangeable manner with a plurality of parking spaces; or with a computer system managing such a fleet.

13. The method of claim 3, wherein determining if the vehicle is a member of a group of vehicles that are compatible with the charging terminal comprises digital communication of the recharging terminal with the connected vehicle.

14. The method of claim 4, further comprising triggering at least one operation of recharging the vehicle by the recharging terminal.

15. The method of claim 10, wherein the determined time phase represents a period during which the vehicle occupying the managed parking space is allocated to a specific user by a computer system managing a plurality of vehicles which are compatible in an interchangeable manner with a plurality of parking spaces.

16. A method for managing a parking space for a vehicle, said parking space comprising means for detecting the occupation of said parking space and at least one power recharging terminal capable of providing electricity to a vehicle connected to this terminal, the method comprising, within a phase called occupation monitoring:

detecting a state of presence or absence of a vehicle occupying the managed parking space, and detecting a state of connection or not of a vehicle to the recharging terminal;

said method comprising moreover, in the case of a detection of presence without detection of a connection, at least one processing operation called parking processing operation, comprising transmitting at least one warning by audible or visual means, or by recording or transmission of a computerized message, wherein the parking processing operation comprises verifying if the detected vehicle is a member of a group of vehicles which are compatible with the recharging terminal, and wherein the verification of membership comprises a comparison between:

on the one hand an item of data representing the geographical position of the managed parking space, and on the other hand a database containing the current positions of vehicles included in a list of vehicles which are compatible with the recharging terminal.

* * * * *